United States Patent [19]
Diez

[11] Patent Number: 6,125,672
[45] Date of Patent: Oct. 3, 2000

[54] SECURITY DEVICES FOR VEHICLE

[76] Inventor: Adalberto Diez, 7830 W. 8th Ave., Hialeah, Fla. 33014

[21] Appl. No.: 09/513,455

[22] Filed: Mar. 3, 2000

[51] Int. Cl.⁷ .................................................. B60R 25/00
[52] U.S. Cl. .................................. 70/226; 70/14; 70/237; 188/32
[58] Field of Search ........................... 70/209–212, 237, 70/238, 225–228, 14, 18, 19, 259, 260, 232–235; 188/32, 36

[56] References Cited

U.S. PATENT DOCUMENTS

| | | | |
|---|---|---|---|
| 770,510 | 9/1904 | Stullken | 188/32 |
| 1,254,920 | 1/1918 | Mathias | 188/32 |
| 1,912,038 | 5/1933 | Irish | 188/32 |
| 2,465,551 | 3/1949 | Otterness | 188/32 |
| 2,630,192 | 3/1953 | Stenhouse | 188/32 |
| 3,695,071 | 10/1972 | West | 70/225 |
| 3,845,643 | 11/1974 | Barrett | 70/226 X |
| 4,126,228 | 11/1978 | Bala et al. | 70/234 X |
| 4,709,432 | 12/1987 | Barrick | 188/32 X |
| 4,913,265 | 4/1990 | Richards | 70/226 X |
| 5,333,477 | 8/1994 | Davis | 70/226 |
| 5,464,076 | 11/1995 | Benedetto, Jr. | 188/32 |
| 5,655,631 | 8/1997 | Richardson | 188/32 |
| 5,706,682 | 1/1998 | Barker et al. | 70/226 |
| 5,735,410 | 4/1998 | Kallstrom | 70/235 X |
| 5,832,759 | 11/1998 | Yamabe | 70/226 |
| 5,927,108 | 7/1999 | Pierce | 70/226 X |
| 6,000,255 | 12/1999 | Lester | 70/226 |

FOREIGN PATENT DOCUMENTS

| | | | |
|---|---|---|---|
| 2110175 | 6/1983 | United Kingdom | 70/226 |
| 2112725 | 7/1983 | United Kingdom | 70/226 |
| 2206552 | 7/1983 | United Kingdom | 70/226 |
| 85/02823 | 7/1985 | WIPO | 70/237 |

*Primary Examiner*—Suzanne Dino Barrett
*Attorney, Agent, or Firm*—J. Sanchelima

[57] ABSTRACT

A security device for immobilizing a vehicle by securing one or more of its wheels to a fixed location. The device includes an anchorage assembly mounted on a flat horizontal surface that includes two spaced apart channels and one stopper member near to one of the channels. A central assembly with three walls, perpendicularly mounted to each other, is slidably mounted to the anchorage assembly. A holding assembly removably locks central and holding assemblies together. The central assembly has several arms that extend radially outwardly and embrace a vehicle's wheel. A reinforcing arched member connects the bent portions of the arms enhancing the structural integrity of the holding assembly.

6 Claims, 2 Drawing Sheets

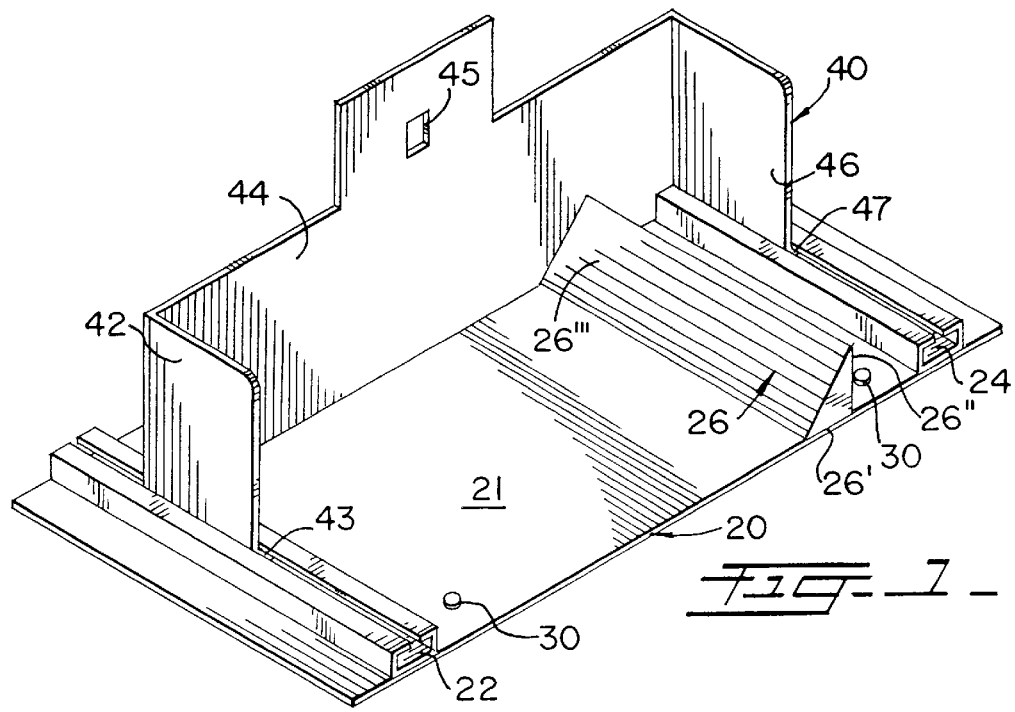
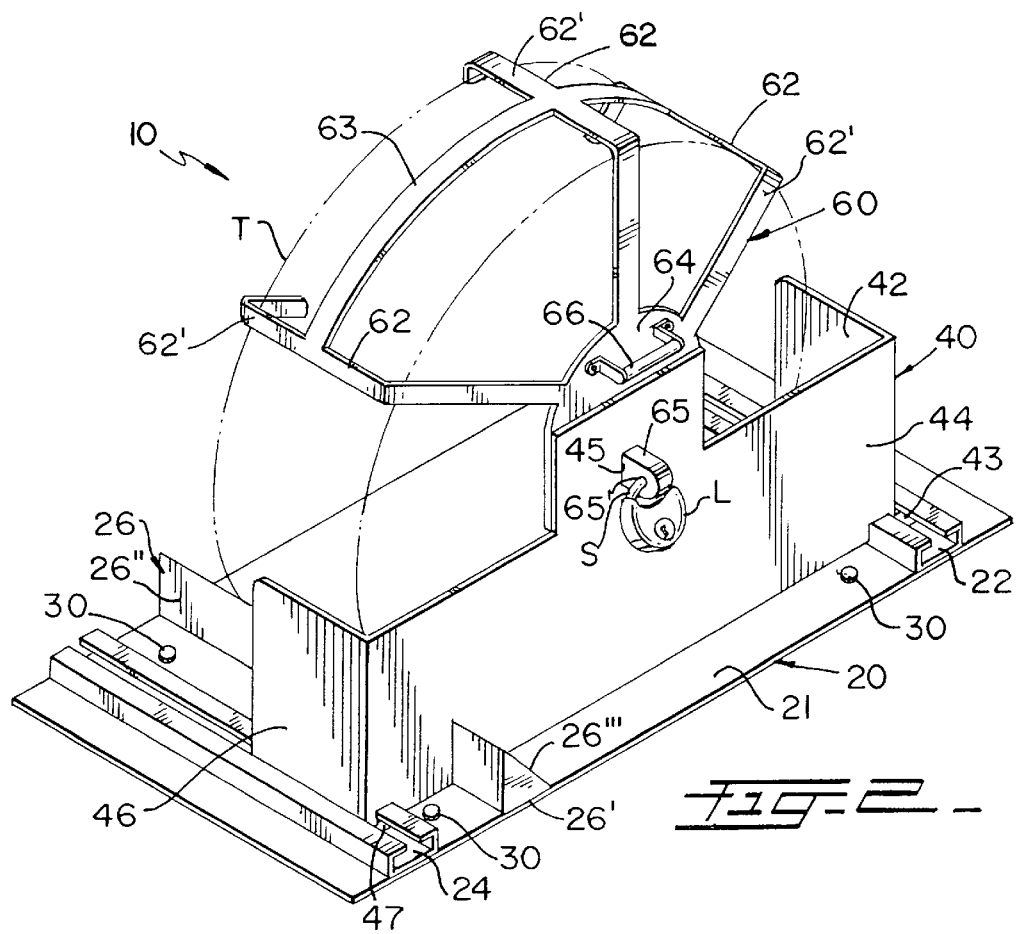

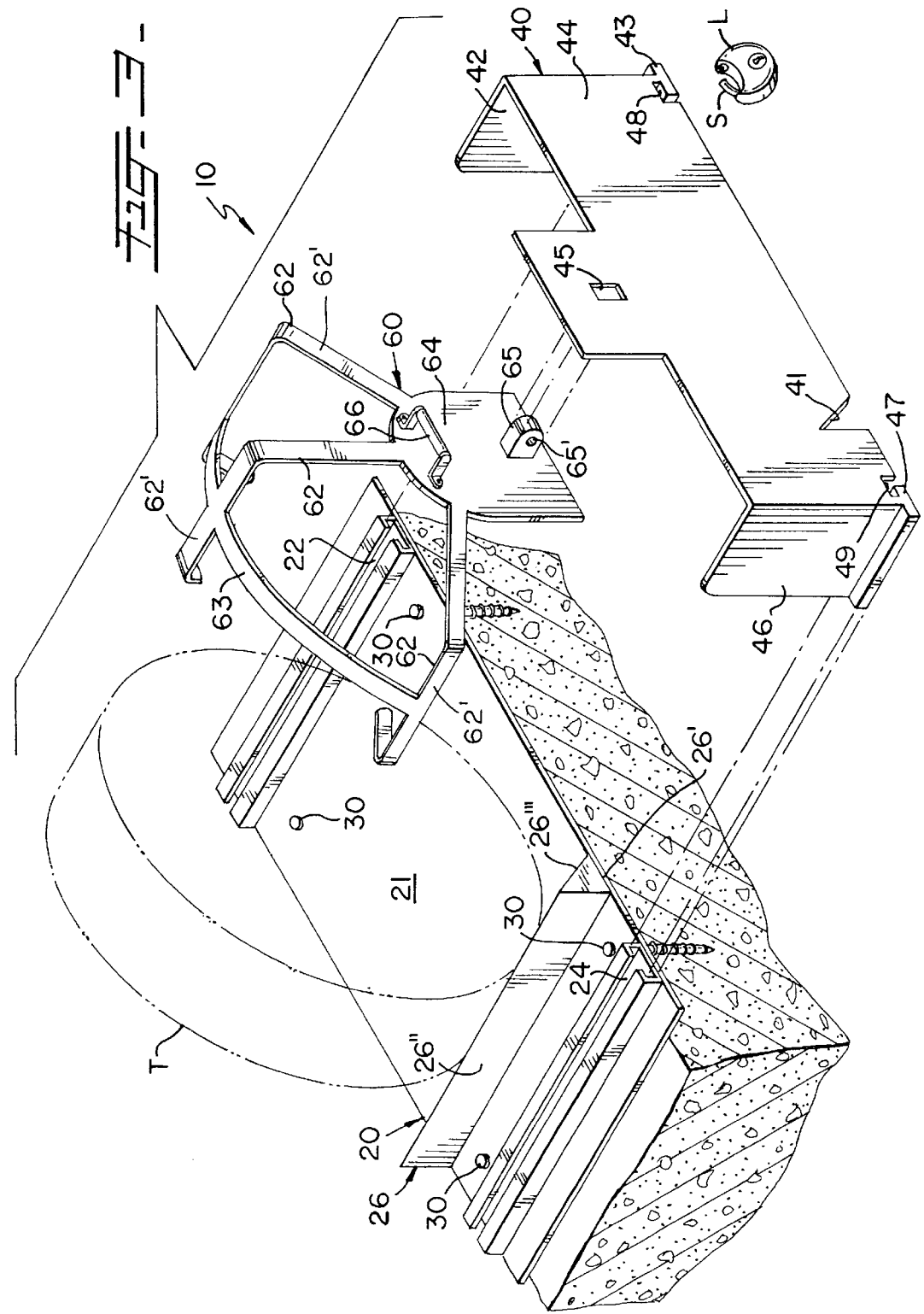

SECURITY DEVICES FOR VEHICLE

BACKGROUND OF THE INVENTION

1. Field of the Invention

The present invention relates to an security device for vehicles, and more particularly, to a device that locks a vehicle in place.

2. Description of the Related Art.

Many designs for security device for vehicles have been designed in the past. None of them, however, include a locking assembly that is attached to a vehicle's wheel. and its lower side attached to the parking's floor.

Applicant believes that the closest reference corresponds to U.S. Pat. No. 5,214,944 issued to Wolthoff in 1993 for Rod Stabilizer and Clamping Device. However, it differs from the present invention because while the Wolthoff's invention locks the wheel, it is not attached to the floor. The advantage of the present invention is to provide a secure anchorage that prevents the unauthorized removal of the vehicle by others or by the effects of the elements.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a security device for vehicles that ensure that the vehicle remains in place.

It is another object of this invention to provide a device that prevents the lifting and transportation of a vehicle without the owner's authorization or in the event of hurricanes and floods by elements.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction wit the accompanying drawings in which:

FIG. 1 shows an isometric view of the anchorage assembly with the central assembly slidably mounted thereon.

FIG. 2 represents an isometric view of one of the preferred embodiments for the present invention holding a vehicle's wheel (in phantom).

FIG. 3 illustrates an exploded view of the security device for vehicles (wheel in phantom).

DETAILED DESCRIPTION OF THE PREFERRED EMBODIMENT

Referring now to the drawings, where the present invention is generally referred to with numeral 10, it can be observed that it basically includes anchorage assembly 20, central assembly 40 removably mounted to assembly 20 and adjustable to different tire dimensions. Additionally, tire holding assembly 60 is removably mounted to central assembly 40 trapping tire T.

As seen in FIG. 1, anchorage assembly 20 is, in the preferred embodiment, a flat plate 21 with two C-channels 22 and 24 at spaced apart and parallel relationship with respect to each other. Anchorage assembly 20 also includes stopper member 26 mounted on plate 21 and parallel and adjacent to C-channel 24. Member 26 has a substantially triangular shape. Surface 26' is rigidly attached to flat plate 21 and surface 26" is mounted at a parallel and spaced apart relationship with respect to C-channel 24 and extends perpendicularly upwardly from plate 21. In this manner, when a user parks his or her vehicle, and one of the wheels W is positioned over plate 21, it is stopped by wall surface 26'" of stopper member 26, as best seen in FIG. 2. Fastening members 30 keep plate 21 in place.

Central assembly 40 includes two lateral walls 42 and 46 and front wall 44. Lateral walls 42 and 46 are perpendicularly mounted to the ends of front wall 44. Lateral walls 42 and 46 include longitudinal T-shape terminations 43 and 47, respectively, mounted to the lower edges of walls 42 and 46 of central assembly 40. Longitudinal T-shape terminations 43 and 47 slidably mount to C-channels 22 and 24 respectively to adjust central assembly 40 to tire assembly T. As best seen in figures l and 3, front wall 44 includes aperture 45 in its upper part. Front wall 44 of central assembly 40, also includes apertures 48 and 49, in the inner side of longitudinal T-shape terminations 43 and 47 respectively, that are received within C-channels 22 and 24. Cut-out 41 is cooperatively located and shaped on front wall 44 to permit stopper member 26 through, as shown in FIGS. 2 and 3.

FIGS. 2 and 3, show tire holding assembly 60 with a plurality of arm members 62, connector member 63, central portion 64, and handle member 66. Arm members 62 extend radially from central portion 64 to secure tire assembly T. Arched member 63 is rigidly connected to the upper side or bend portion 62' of members 62 to keep stability on holding assembly 60. Central portion 64 includes pin member 65 that cooperatively protrudes through the aperture 45 defined in front wall 44 of central assembly 40. Pin member 65 has through opening 65' that allows shackle S of lock securely device L to pass through to security attach central assembly 40 and tire holding assembly 60. Handle member 66 permits a user to position holding assembly 60.

A user parks his or her vehicle in a predetermined location so that one of the wheels is positioned over plate 21, between C-channel 22 and stopper member 26. Central assembly 40 is slid in place, against tire T. Tire holding assembly 60 is then mounted over tire T with pin 65 protruding through aperture 45. A lock shackle S is passed through opening 65'. The vehicle is thus immobilized.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A security device for immobilizing a vehicle's wheel, comprising:

A) an anchorage assembly including a flat plate member with first and second ends, and further including two elongated straight C-channel members mounted on said plate member adjacent to said first and second ends, respectively;

B) fastening means to secure said plate member to a horizontal surface;

C) a central assembly having first, second and third walls, each having first, second, third, and fourth edges, said first and second walls mounted perpendicularly to said third wall and said first edges, said first and second walls being kept at a spaced apart and parallel relationship with respect to each other, and said second edges of said first and second walls include T-shape terminations that are slidably and cooperatively receivable within said C-channels so that said central assembly is kept perpendicularly with respect to said anchorage assembly;

D) a holding assembly for engaging a wheel, said holding assembly including a flat central portion and a plurality of arms extending radially therefrom and each of said arms includes a bent portion at their distal ends that cooperates to embrace a wheel; and E) locking means for securing said central and holding assemblies together.

2. The device set forth in claim 1 further including:

F) stopper means mounted on said plate member and between said C-channel members at a predetermined position to permit a wheel to come in contact with said stopper means indicating the parking position.

3. The device set forth in claim 2 wherein said third wall includes a cut-out with cooperative dimensions to avoid interference with said stopper means.

4. The device set forth in claim 3 wherein said holding assembly includes an arched member connecting said bent portion thereby enhancing the structural integrity of said arms.

5. The device set forth in claim 4 wherein said locking means includes a pin member perpendicularly mounted to said flat central portion, said pin member further including a through opening and said third wall includes a cooperating aperture that permits said pin member to go through and said locking means includes a lock member with a shackle that is removably passed through said through opening.

6. The device set forth in claim 5 further including:

G) handle means mounted on said flat central portion to provide a grip to a user for handling said holding assembly.

* * * * *